US012563049B2

(12) United States Patent
Grebennikov et al.

(10) Patent No.: US 12,563,049 B2
(45) Date of Patent: Feb. 24, 2026

(54) SYSTEMS AND METHODS FOR A.I.-BASED MALWARE ANALYSIS ON OFFLINE ENDPOINTS IN A NETWORK

(71) Applicant: Acronis International GmbH, Schaffhausen (CH)

(72) Inventors: Nikolay Grebennikov, Moscow (RU); Candid Wüest, Bassersdorf (CH); Serguei Beloussov, Costa del Sol (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 357 days.

(21) Appl. No.: 17/539,290

(22) Filed: Dec. 1, 2021

(65) Prior Publication Data

US 2022/0210169 A1     Jun. 30, 2022

Related U.S. Application Data

(60) Provisional application No. 63/130,965, filed on Dec. 28, 2020.

(51) Int. Cl.
| | |
|---|---|
| *H04L 9/40* | (2022.01) |
| *G06F 21/51* | (2013.01) |
| *G06F 21/56* | (2013.01) |
| *G06N 20/00* | (2019.01) |

(52) U.S. Cl.
CPC .......... *H04L 63/1416* (2013.01); *G06F 21/51* (2013.01); *G06F 21/56* (2013.01); *G06N 20/00* (2019.01); *H04L 63/1425* (2013.01)

(58) Field of Classification Search
CPC . H04L 63/1416; H04L 63/1425; G06N 20/00; G06F 21/51; G06F 21/56
See application file for complete search history.

(56) References Cited

U.S. PATENT DOCUMENTS

| | | | |
|---|---|---|---|
| 2014/0165203 A1* | 6/2014 | Friedrichs | G06F 21/552 |
| | | | 726/24 |
| 2019/0042743 A1* | 2/2019 | Chen | G06N 20/00 |
| 2020/0274815 A1* | 8/2020 | Sreevalsan | H04L 47/2441 |
| 2020/0279200 A1* | 9/2020 | Makhija | G06N 3/049 |
| 2020/0311273 A1* | 10/2020 | Knox | G06N 5/02 |

(Continued)

*Primary Examiner* — Joseph L Greene
(74) *Attorney, Agent, or Firm* — ArentFox Schiff LLP; Michael Fainberg

(57) ABSTRACT

Disclosed herein are systems and method for optimizing artificial intelligence (A.I)-based malware analysis on offline endpoints in a network. In one aspect, a method includes identifying a file that has not been executed on an endpoint system and scanning the endpoint system to detect malicious behavior using a machine learning algorithm. In response to determining that the endpoint system does not exhibit malicious behavior based on the machine learning algorithm, the method includes enabling execution of the file. Subsequent to the execution of the file, the method includes rescanning the endpoint system to detect malicious behavior using the machine learning algorithm. In response to determining that the endpoint system does exhibit malicious behavior subsequent to the execution, the method includes extracting attributes of the file and retraining the machine learning algorithm using the extracted attributes to detect malicious behavior associated with the file without having to execute the file.

17 Claims, 3 Drawing Sheets

(56)            References Cited

U.S. PATENT DOCUMENTS

| | | | |
|---|---|---|---|
| 2020/0382470 A1* | 12/2020 | Butler | G06F 21/554 |
| 2020/0394305 A1* | 12/2020 | Cosgrove | G06F 21/56 |
| 2021/0329029 A1* | 10/2021 | Vasseur | H04L 43/065 |
| 2022/0067106 A1* | 3/2022 | Saez | H04L 67/06 |
| 2022/0086071 A1* | 3/2022 | Sivaraman | H04L 43/065 |
| 2022/0166783 A1* | 5/2022 | Yavo | H04L 63/1425 |

* cited by examiner

Figure 1:
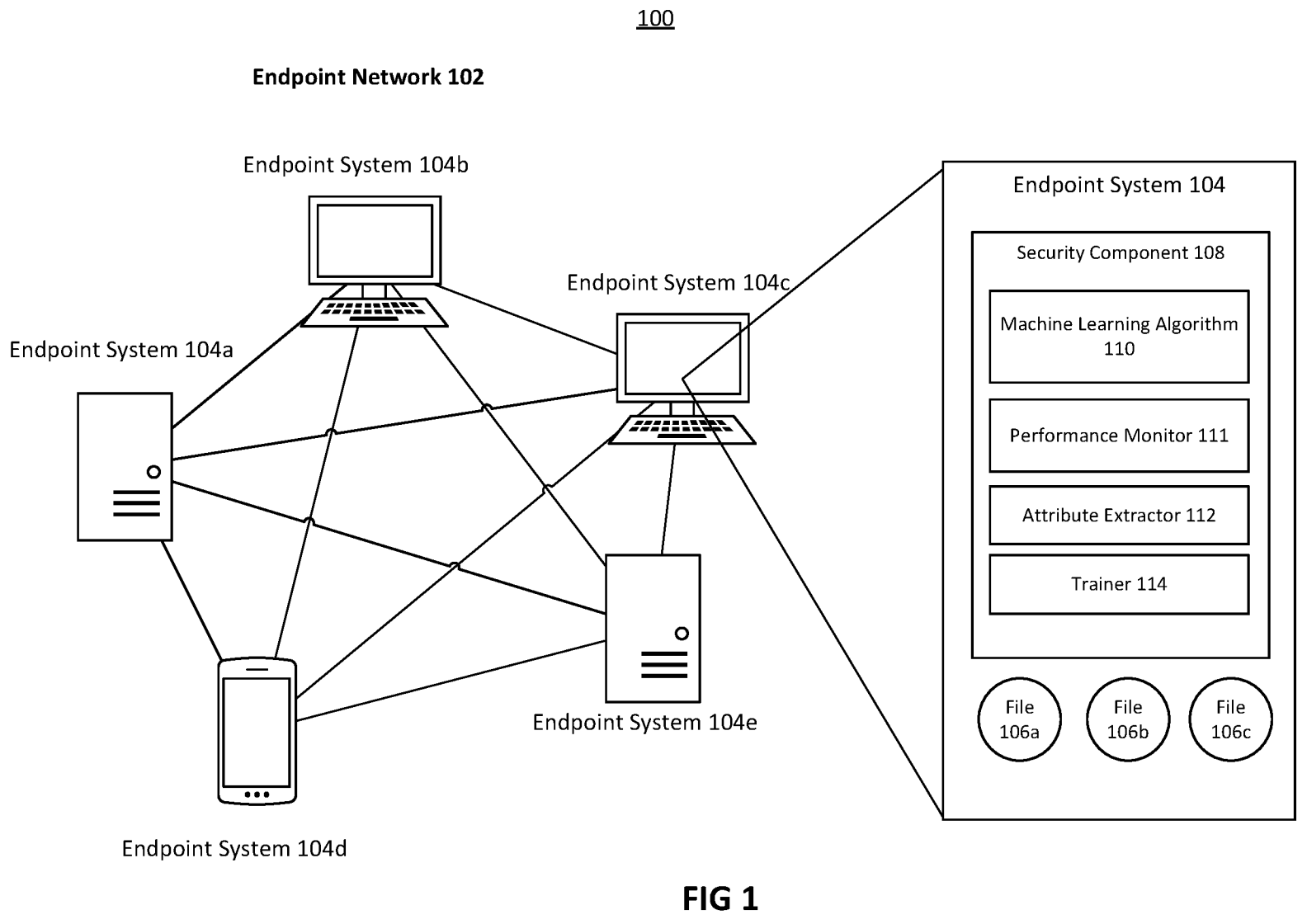

100

Endpoint Network 102

Endpoint System 104

Security Component 108

Machine Learning Algorithm 110

Performance Monitor 111

Attribute Extractor 112

Trainer 114

File 106a

File 106b

File 106c

Endpoint System 104c

Endpoint System 104e

Endpoint System 104b

Endpoint System 104a

Endpoint System 104d

SYSTEMS AND METHODS FOR A.I.-BASED MALWARE ANALYSIS ON OFFLINE ENDPOINTS IN A NETWORK

CROSS-REFERENCE TO RELATED APPLICATIONS

This application claims the benefit of U.S. Provisional Application No. 63/130,965, filed Dec. 28, 2020, which is herein incorporated by reference.

FIELD OF TECHNOLOGY

The present disclosure relates to the field of data security, and, more specifically, to systems and methods for optimizing A.I-based malware analysis on offline endpoints in network.

BACKGROUND

In modern computer security systems, artificial intelligence (A.I) is often employed to detect malicious cyberattacks. However, conventional A.I models that are pre-trained cannot detect all threat types equally well because there are many different threat categories and because threats evolve over time. Consider an organization with various endpoint systems. The organization may have its very own threat groups based on technology sector, geo-location, infrastructure, etc. As conventional A.I models are not typically fine-tuned for an organization, they may miss several threats or may detect "threats" that are in fact false positives.

Furthermore, many endpoint systems are not online and therefore cannot be used by a backend cloud to provide metadata for retraining purposes. Even if the endpoint systems are online, sending full files or metadata to the backend cloud for retraining consumes bandwidth and is not desired for privacy.

There thus exists a need for a self-learning A.I-based malware analyzer for offline endpoints in a network.

SUMMARY

In one exemplary aspect, the techniques described herein relate to a method for optimizing artificial intelligence (A.I)-based malware analysis on offline endpoints in a network, the method including: identifying a file that has not been executed on an endpoint system; scanning the endpoint system to detect malicious behavior using a machine learning algorithm; in response to determining that the endpoint system does not exhibit malicious behavior based on the machine learning algorithm, enabling execution of the file; subsequent to the execution of the file, rescanning the endpoint system to detect malicious behavior using the machine learning algorithm; in response to determining that the endpoint system does exhibit malicious behavior subsequent to the execution, extracting attributes of the file; and retraining the machine learning algorithm using the extracted attributes to detect malicious behavior associated with the file without having to execute the file.

In some aspects, the techniques described herein relate to a method, further including: identifying another file that has not been executed on an endpoint system, wherein the another file shares attributes with the file; scanning the endpoint system to detect malicious behavior using the retrained machine learning algorithm; and in response to determining that the another file exhibits malicious behavior, inhibiting the another file from executing.

In some aspects, the techniques described herein relate to a method, wherein the attributes are pre-execution attributes indicative of at least one of: (1) installation source, (2) installation time, (3) dependencies, (4) time spent on the endpoint system, (5) file type.

In some aspects, the techniques described herein relate to a method, wherein retraining the machine learning algorithm includes: generating a training vector that links the pre-execution attributes to presence of malicious behavior; and training the machine learning algorithm with the generated training vector.

In some aspects, the techniques described herein relate to a method, wherein the endpoint system is an offline system that is part of the network including a plurality of endpoint systems, wherein each endpoint system has a respective local machine learning algorithm.

In some aspects, the techniques described herein relate to a method, further including: detecting that the endpoint system is online; in response to detecting that the endpoint system is online, transmitting the extracted attributes to other endpoint systems of the plurality of endpoint systems, wherein each other endpoint system is configured to receive and retrain each respective local machine learning algorithm based on the extracted attributes.

In some aspects, the techniques described herein relate to a method, wherein transmitting the extracted attributes to the other endpoint systems is further in response to determining that the other endpoint systems are of a same class as the endpoint system.

In some aspects, the techniques described herein relate to a method, further including: detecting that the endpoint system is online; in response to detecting that the endpoint system is online, querying other endpoint systems of the plurality of endpoint systems for updated attributes; receiving updated attributes for another file; and retraining the machine learning algorithm using the received updated attributes.

In some aspects, the techniques described herein relate to a method, further including: scanning the endpoint system to detect malicious behavior using the retrained machine learning algorithm, wherein the another file is stored on the endpoint system; and determining that the endpoint system exhibits malicious behavior associated with the another file.

It should be noted that the methods described above may be implemented in a system comprising a hardware processor. Alternatively, the methods may be implemented using computer executable instructions of a non-transitory computer readable medium.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 1 is a block diagram illustrating a system for optimizing A.I-based malware analysis on offline endpoints in network.

DETAILED DESCRIPTION

Figure 2:
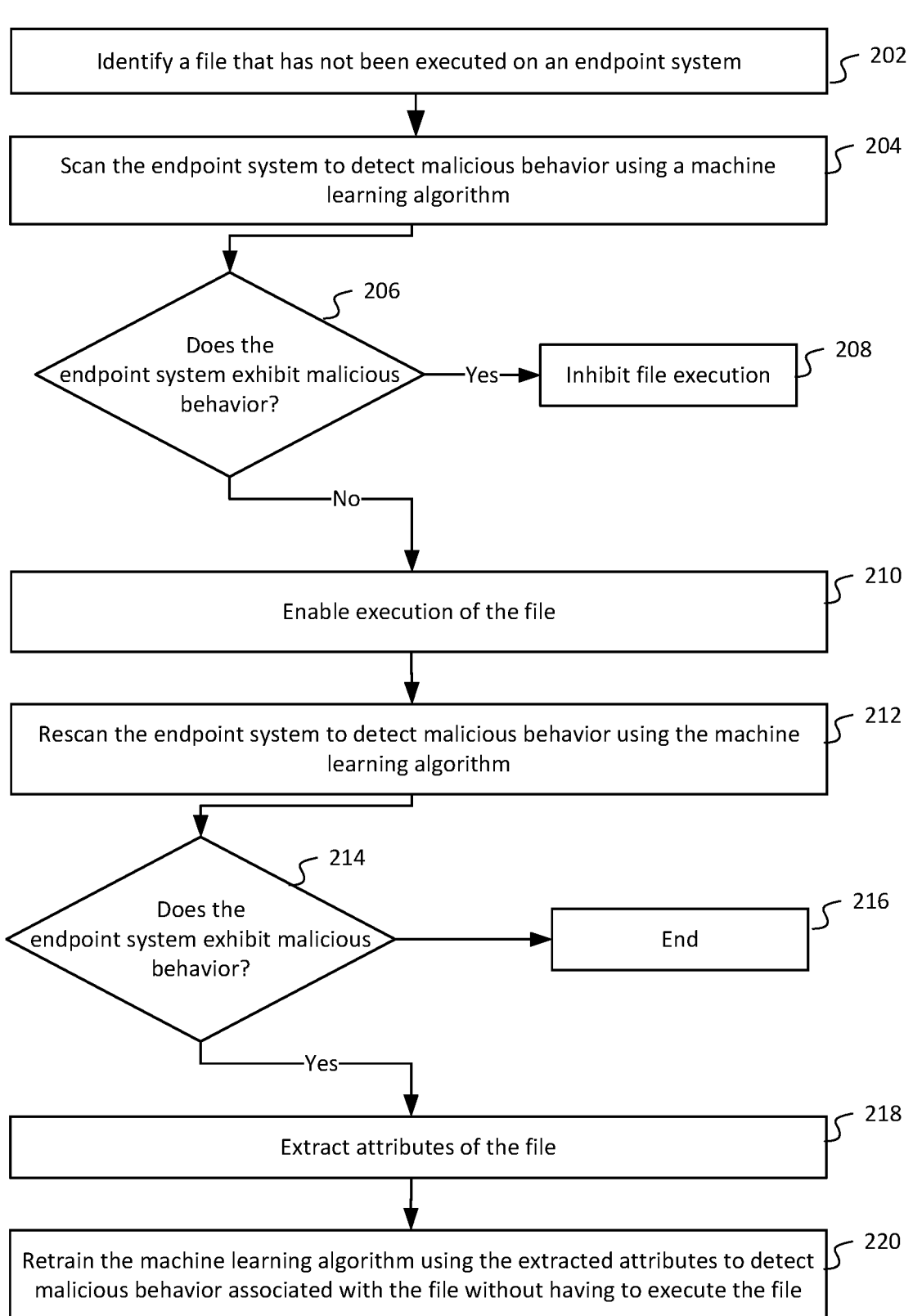
FIG. 2 illustrates a flow diagram of a method for optimizing A.I-based malware analysis on offline endpoints in network.

Exemplary aspects are described herein in the context of a system, method, and computer program product for optimizing A.I-based malware analysis on offline endpoints in network. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

To address the shortcomings discussed in the background, the present disclosure describes systems and methods for optimizing A.I-based malware analysis. According to implementations of the present disclosure, every time a threat is locally detected after the execution of a file (e.g., based on anti-virus program detection, endpoint detection and response (EDR), user decision, etc.), the file is used to retrain the local A.I model in order to better detect similar threats in the future. Retraining will be done offline without the need for a cloud connection, and will improve the detection rate for local relevant threats and local environment.

Consider the conventional approach in which full files or metadata are sent to a backend cloud for retraining a universal machine learning algorithm or for classification by the universal machine learning algorithm. Depending on the amount of files and the size of each file, the endpoint system will require being online and will consume a considerable amount of bandwidth of the network. Beyond a certain threshold bandwidth usage, this becomes unreasonable because multiple endpoint systems may be relying on the same backend cloud. A local classification method is thus needed.

Furthermore, a universal machine learning algorithm may be ineffective in identifying attacks that are unique to a particular type of endpoint system (i.e., not an issue for another endpoint system). For example, an organization may have endpoint systems for their marketing team and endpoint systems for their human resources team. A script that retrieves values, determines an average, and transmits the result may attempt to access a file in a particular directory. Execution of the script may be considered as malicious behavior if the particular directory is protecting confidential information such as employee salaries on a human resources endpoint system. However, the script may not be malicious if executed on a marketing endpoint system where the average being taken is of public information such as the amount of money dollars earned by a series of movie releases. A universal machine learning algorithm will be unable to determine whether script is indeed malicious because each endpoint system has its own configuration of security (e.g., certain types of files may be considered private on one endpoint and not on another). Determining the motives of a script are thus better determined locally.

FIG. 1 is a block diagram illustrating system 100 for optimizing A.I-based malware analysis on offline endpoints in a network. System 100 comprises endpoint network 102, which is made up of a plurality of endpoint systems (e.g., systems 104*a-e*). An endpoint system may be any computing device such as a computer, laptop, server, smartphone, smartwatch, smart speaker, etc., that is capable of connecting to another computing device and storing data. Endpoint network 102 is made up of, for example, two computers (endpoint system 104*b*, endpoint system 104*c*), two servers (endpoint system 104*a*, endpoint system 104*e*), and a smartphone (endpoint system 104*d*). Endpoint system 104*c* is magnified for a more detailed look into the computing device. Endpoint system 104*c* may be a computer that stores data such as files 106*a*, 106*b*, and 106*c*, and a security component 108, which is configured to protect endpoint system 104*c* from malicious activity. Such activity may include ransomware, adware, malware, viruses, Trojans, hacking, etc.

Security component 108 may be a component of a computer security software (e.g., an anti-virus program) installed on endpoint system 104*c*, or may be a standalone security software. As depicted in FIG. 1, security component 108 comprises machine learning algorithm 110, attribute extractor 112, and trainer 114. The present disclosure describes system 100 for optimizing artificial intelligence (A.I)-based malware analysis on offline endpoints in a network. In an exemplary aspect, security component 108 may identify file 106*a* on endpoint system 104*c*. File 106*a* may not have been previously executed on endpoint system 104*c*. For example, file 106*a* may be an application, document, media file, library file, etc., that has not been opened or access by a user or endpoint system 104*c*. Suppose that file 106*a* is a PDF document that was downloaded from the Internet. A malicious executable may be embedded in the PDF document such that when the PDF document is opened, the executable is launched.

Security component 108 may begin scanning endpoint system 104*c* to detect malicious behavior using machine learning algorithm 110. Machine learning algorithm 110 may be a classifier that is trained on a dataset including pre-labelled classifications of whether malicious behavior exists and the associated attributes of files on the endpoint system. In some aspects, this dataset may be stored in the memory of endpoint system 104*c* and is accessible by trainer 114, which is configured to train machine learning algorithm 110. Attribute extractor 112 may extract attributes of each file on endpoint system 104*c* and determine whether malicious behavior is exhibited on endpoint system 104*c*. In some aspects, trainer 114 generates a machine learning vector that includes attributes of each file. An example vector may be:

| Name | Type | Location | Size | Created | Last Accessed | Where From |
|---|---|---|---|---|---|---|
| XYZ.pdf | PDF | C:\Users\admin\ Desktop | 500 KB | Oct. 2, 2000 15:11:00 | Oct. 2, 2000 15:11:00 | www.xyz.com |

In this example, the attributes extracted by attribute extractor 112 include a name, type, location, size, creation timestamp, last accessed timestamp, and origin point (e.g., the URL where the file was downloaded from). Using the server name in the URL of the "where from" or "origin point" attribute, the IP address associated with the file may be determined. Thus, in some aspects, the "where from" attribute includes the IP address. It should be noted that the vector may include other attributes not shown above such as permissions the file has (e.g., read, execute, write, modify), a version of the file if there is one, an owner of the file, when last modified, identifiers of applications used to open the file, etc. In some aspects, the attributes further include an installation time (e.g., when did file 106a get downloaded), dependencies (e.g., names of processes, applications, etc., that file 106a needs to run), and time spent on the endpoint system (e.g., how long file 106a has been on endpoint system 104c without being executed). The dataset that is used to train machine learning algorithm 110 has a plurality of machine learning vectors (similar to the example vector above) and each vector includes a classification column that indicates either "malicious" or "not malicious." Based on the training, machine learning algorithm 110 may classify the above example vector as "not malicious."

In response to determining that endpoint system 104c does not exhibit malicious behavior based on machine learning algorithm 110 (i.e., the scanned file 106a is not deemed malicious), security component 108 may enable ated with the execution/access of file 106a. For example, performance monitor 111 may map the malicious behavior, such as a degradation in performance or functionality, to the execution/access of file 106a based on determining that the malicious behavior began within a threshold period of time (e.g., 30 seconds) after the execution/access of file 106a. In response to determining that endpoint system 104c does exhibit malicious behavior subsequent to the execution, attribute extractor 112 may extract attributes of file 106a for inclusion in the training dataset.

An object of the present disclosure is to adjust machine learning algorithm 110 in a manner that enables it to detect the potential malicious behavior of file 106a before it is executed. This is because when file 106a does execute, it deals damage to endpoint system 104c. This damage should be made avoidable in future instances. As a result, trainer 114 retrains machine learning algorithm 110 using the extracted attributes to detect malicious behavior associated with file 106a without having to execute file 106a. During retraining, trainer 114 may generate a training vector that links the pre-execution attributes to presence of malicious behavior. This training vector may be added to the dataset used by trainer 114 for training. Trainer 114 may then train machine learning algorithm 110 with the generated training vector. For example, trainer 114 may add the following vector to the dataset and include a verdict of "malicious" to the vector.

| Name | Type | Location | Size | Created | Last Accessed | Where From | Verdict |
|------|------|----------|------|---------|---------------|------------|---------|
| XYZ.pdf | PDF | C:\Users\admin\Desktop | 500 KB | Oct. 2, 2000 15:11:00 | Oct. 2, 2000 15:11:00 | www.xyz.com | Malicious | execution of file 106a. For example, security component 108 may allow the PDF document to be opened because attributes of the document do not appear malicious. Subsequent to the execution of file 106a, security component 108 may re-evaluate endpoint system 104c (e.g., using performance monitor 111) to detect malicious behavior using machine learning algorithm 110. Signs of malicious behavior can include unauthorized encryption (e.g., if performance monitor 111 detects an encryption command that was not trig- After machine learning algorithm 110 has been re-trained, it should be able to detect that file 106a is malicious without having file 106a execute or be accessed. Suppose that security component 108 identifies another file (e.g., file 106b) that has not been executed on endpoint system 104c. File 106b shares attributes with file 106a. For example, file 106b may come from the same source, may also be a PDF document, and may have the same dependencies. The attributes extracted by attribute extractor 112 may be:

| Name | Type | Location | Size | Created | Last Accessed | Where From |
|------|------|----------|------|---------|---------------|------------|
| ABC.pdf | PDF | C:\Users\admin\Desktop | 505 KB | Oct. 7, 2000 16:11:00 | Oct. 7, 2000 16:11:00 | www.xyz.com | gered by the user), degraded performance (e.g., higher than a threshold CPU and/or RAM utilization, latency in launching applications), crashes (e.g., an application crashes), additional network connections (e.g., if a remote connection has been launched that accesses the computer, memory errors (e.g., corrupted files), etc. For example, a user may access the PDF document via a PDF reader application. When the document is opened, the malicious executable begins to run and then endpoint system 104c may determine that the execution of file 106a has caused functionality or performance issues in endpoint system 104c during the evaluation by performance monitor 111. Security component 108 may then determine (based on the functionality and performance issues) that the malicious behavior is associ- When security component 108 scans endpoint system 104c to detect malicious behavior using the retrained machine learning algorithm 110, security component 108 may determine that file 106b exhibits malicious behavior and may inhibit file 106b from executing or from being accessed. For example, security component 108 may initiate an alert if a user attempts to access file 106b, may delete file 106b automatically, or may quarantine file 106b.

As discussed previously, endpoint system 104c may be an offline system that is part of network 102 comprising a plurality of endpoint systems. Each endpoint system of network 102 may have its own security component with a respective local machine learning algorithm.

In some aspects, security component 108 on endpoint system 104*c* may detect that endpoint system 104*c* is online. In response to detecting that endpoint system 104*c* is online, security component 108 may transmit the extracted attributes to other endpoint systems of the plurality of endpoint systems. This is a part of the shared learning features of security component 108. Having identified file 106*a* as a malicious file, security component 108 informs other endpoint systems of its attributes to bolster their own security. Each other endpoint system is further configured to receive and retrain each respective local machine learning algorithm based on the extracted attributes.

Likewise, security component 108 on endpoint system 104*c* may receive information about malicious files and their attributes from other endpoint systems in network 102. Again, security component 108 may detect that endpoint system 104*c* is online. In response to detecting that endpoint system 104*c* is online, security component 108 may query other endpoint systems of the plurality of endpoint systems for updated attributes. Security component 108 may then receive updated attributes for another file (e.g., file 106*c*), and trainer 114 may retrain machine learning algorithm 110 using the received updated attributes.

In some aspects, security component 108 may then scan endpoint system 104*c* to detect malicious behavior using the retrained machine learning algorithm, wherein the another file (e.g., file 106*c*) is stored on endpoint system 104*c*. Security component 108 may then determine that endpoint system 104*c* exhibits malicious behavior associated with file 106*c*. Thus, security component 108 on endpoint system 104*c* can determine that file 106*c* is associated with malicious behavior before letting file 106*c* execute.

In some aspects, security component 108 may classify an endpoint system into one of a plurality of classes. These classes may be different depending on the organization associated with endpoint network 102. For example, if the organization is a company, the classes may be the different departments in the company (e.g., human resources, finance, legal, marketing, executive, etc.). In another example, if the organization is a university, the classes may be different schools within the department (e.g., school of architecture, school of engineering, etc.). The classes are customizable by the administrator of endpoint network 102. For example, an administrator of a university may organize the classes based on role (e.g., student device, campus device, employee device, etc.). Devices that are in common classes may be grouped together. For example, endpoint system 104*b* and endpoint system 104*c* may be in a "human resources" class of a company associated with endpoint network 102. Endpoint system 104*e* and endpoint system 104*a* may be in a "marketing" class.

As discussed previously, a file that is considered malicious on one endpoint system, based on configurations of the endpoint system, may not be malicious on another endpoint system. When sharing attributes (or more specifically training vectors), security component 108 of a source endpoint system may determine the class of the destination endpoint system. In response to determining that the classes between the source endpoint system and the destination endpoint system match, security component 108 may transmit the attributes. However, if the classes do not match, security component 108 may refrain from transmitting the attributes. This enables similar devices from being protected, while reducing false positives.

In some aspects, security component 108 may determine the class based on a configuration comparison between two endpoint systems. For example, if an organization has not pre-set the classes, security component 108 may perform a parameter scan of the endpoint system. The parameter scan result comprises a plurality of parameters such as year built, operating system version, hardware attributes (e.g., RAM, memory space, CPU type, etc.), user type (e.g., who logs into the endpoint system), and a list of files stored on the endpoint system. Before sending attributes and/or training vectors to a destination endpoint system, security component 108 may request parameter scan results from the destination endpoint system. Security component 108 may then compare the respective parameter scan results of the source endpoint system and the destination endpoint system to generate a match value (e.g., 50% match). If the match value is greater than a threshold match value (e.g., 60%), security component 108 determines that both endpoint systems are part of the same class and transmits the attributes of the malicious file. If the match value is not greater than the threshold match value, security component 108 refrains from transmitting the attributes. It should be noted that once security component 108 determines that two endpoint systems are from the same class, security component 108 does not need to recheck the match value whenever new attributes are to be shared.

FIG. 2 illustrates a flow diagram of method 200 for optimizing A.I-based malware analysis on offline endpoints in network. At 202, security component 108 identifies a file (e.g., file 106*a*) that has not been executed on an endpoint system (e.g., endpoint system 104*c*). At 204, security component 108 scans the endpoint system to detect malicious behavior using a machine learning algorithm (e.g., algorithm 110). At 206, security component 108 determines whether the endpoint system exhibits malicious behavior. In response to determining that it does, method 200 ends at 208, where security component 108 inhibits the file from executing. Otherwise, method 200 advances to 210, where security component 108 enables execution of the file. At 212, security component 108 rescans the endpoint system to detect malicious behavior using the machine learning algorithm. At 214, security component 108 again determines whether the endpoint system exhibits malicious behavior. If the endpoint system does not exhibit malicious behavior, method 200 ends at 216. Otherwise, method 200 advances to 218, where security component 108 extracts (e.g., via attribute extractor 112) attributes of the file. At 220, security component 108 (e.g., via trainer 114) retrains the machine learning algorithm using the extracted attributes to detect malicious behavior associated with the file without having to execute the file.

Figure 3:
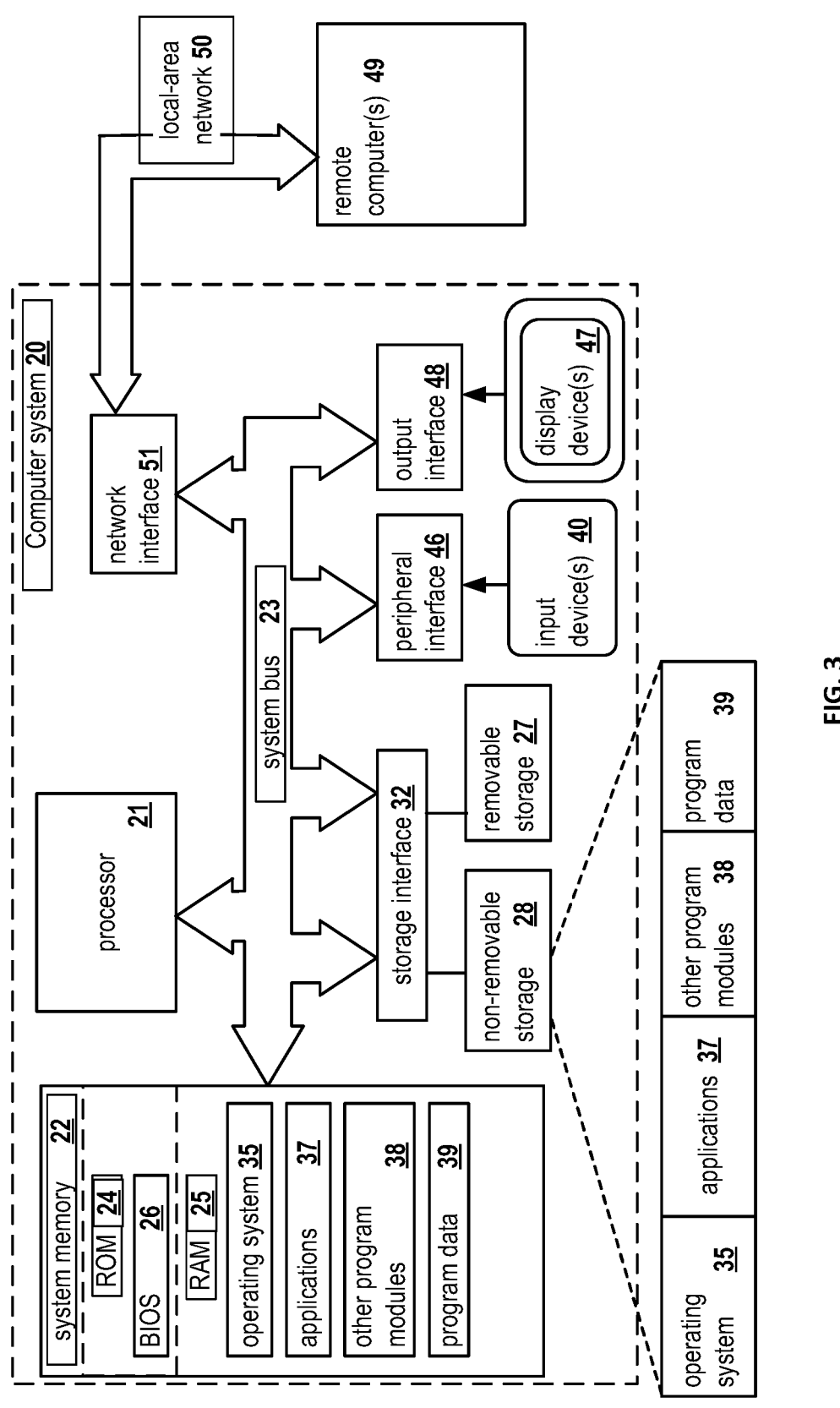
FIG. 3 presents an example of a general-purpose computer system on which aspects of the present disclosure can be implemented.

FIG. 3 is a block diagram illustrating a computer system 20 on which aspects of systems and methods for optimizing A.I-based malware analysis on offline endpoints in network may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-2 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for optimizing artificial intelligence (A.I)-based malware analysis on offline endpoints in a network, the method comprising:

identifying a file that has not been executed on an endpoint system in a network comprising a plurality of endpoint systems;

determining, from a plurality of classes, a class of the endpoint system;

scanning the endpoint system to detect malicious behavior using a machine learning algorithm;

in response to determining that the endpoint system does not exhibit malicious behavior based on the machine learning algorithm, enabling execution of the file;

subsequent to the execution of the file, rescanning the endpoint system to detect malicious behavior using the machine learning algorithm;

in response to determining that the endpoint system does exhibit malicious behavior subsequent to the execution, extracting attributes of the file;

retraining the machine learning algorithm using the extracted attributes to detect malicious behavior associated with the file without having to execute the file;

determining a match value by comparing the class of the endpoint system with classes of other endpoint systems of the plurality of endpoint systems;

determining that the other endpoint systems are of a same class as the endpoint system from the plurality of classes when the match value exceeds a threshold match value; and transmitting the extracted attributes to other endpoint systems of the plurality of endpoint systems in response to determining that the other endpoint systems are of the same class as the endpoint system from the plurality of classes, wherein each other endpoint system is configured to receive and retrain each respective local machine learning algorithm based on the extracted attributes, and wherein the extracted attributes are not transmitted to any endpoint system of the plurality of endpoint systems that is from a class that does not match the class of the endpoint system.

2. The method of claim 1, further comprising:

identifying another file that has not been executed on an endpoint system, wherein the another file shares attributes with the file;

scanning the endpoint system to detect malicious behavior using the retrained machine learning algorithm; and in response to determining that the another file exhibits malicious behavior, inhibiting the another file from executing.

3. The method of claim 1, wherein the attributes are pre-execution attributes indicative of at least one of: (1) installation source, (2) installation time, (3) dependencies, (4) time spent on the endpoint system, (5) file type.

4. The method of claim 3, wherein retraining the machine learning algorithm comprises:

generating a training vector that links the pre-execution attributes to presence of malicious behavior; and training the machine learning algorithm with the generated training vector.

5. The method of claim 1, wherein the endpoint system is an offline system that is part of the network comprising a plurality of endpoint systems, wherein each endpoint system has a respective local machine learning algorithm.

6. The method of claim 5, further comprising:

detecting that the endpoint system is online;

in response to further detecting that the endpoint system is online, transmitting the extracted attributes to the other endpoint systems of the plurality of endpoint systems.

7. The method of claim 5, further comprising:

detecting that the endpoint system is online;

in response to detecting that the endpoint system is online, querying other endpoint systems of the plurality of endpoint systems for updated attributes;

receiving updated attributes for another file; and retraining the machine learning algorithm using the received updated attributes.

8. The method of claim 7, further comprising:

scanning the endpoint system to detect malicious behavior using the retrained machine learning algorithm, wherein the another file is stored on the endpoint system; and determining that the endpoint system exhibits malicious behavior associated with the another file.

9. A system for optimizing artificial intelligence (A.I)-based malware analysis on offline endpoints in a network, the system comprising:

a hardware processor configured to:

identify a file that has not been executed on an endpoint system in a network comprising a plurality of endpoint systems;

determine, from a plurality of classes, a class of the endpoint system;

scan the endpoint system to detect malicious behavior using a machine learning algorithm;

in response to determining that the endpoint system does not exhibit malicious behavior based on the machine learning algorithm, enable execution of the file;

subsequent to the execution of the file, rescan the endpoint system to detect malicious behavior using the machine learning algorithm;

in response to determining that the endpoint system does exhibit malicious behavior subsequent to the execution, extract attributes of the file;

retrain the machine learning algorithm using the extracted attributes to detect malicious behavior associated with the file without having to execute the file;

determine a match value by comparing the class of the endpoint system with classes of other endpoint systems of the plurality of endpoint systems;

determine that the other endpoint systems are of a same class as the endpoint system from the plurality of classes when the match value exceeds a threshold match value; and transmit the extracted attributes to other endpoint systems of the plurality of endpoint systems in response to determining that the other endpoint systems are of the same class as the endpoint system from the plurality of classes, wherein each other endpoint system is configured to receive and retrain each respective local machine learning algorithm based on the extracted attributes, and wherein the hardware processor is configured to not transmit the extracted attributes to any endpoint system of the plurality of endpoint systems that is from a class that does not match the class of the endpoint system.

10. The system of claim 9, wherein the hardware processor is further configured to:

identify another file that has not been executed on an endpoint system, wherein the another file shares attributes with the file;

scan the endpoint system to detect malicious behavior using the retrained machine learning algorithm; and in response to determining that the another file exhibits malicious behavior, inhibit the another file from executing.

11. The system of claim 9, wherein the attributes are pre-execution attributes indicative of at least one of: (1) installation source, (2) installation time, (3) dependencies, (4) time spent on the endpoint system, (5) file type.

12. The system of claim 11, wherein the hardware processor is further configured to retrain the machine learning algorithm by:

generating a training vector that links the pre-execution attributes to presence of malicious behavior; and training the machine learning algorithm with the generated training vector.

13. The system of claim 9, wherein the endpoint system is an offline system that is part of the network comprising a plurality of endpoint systems, wherein each endpoint system has a respective local machine learning algorithm.

14. The system of claim 13, wherein the hardware processor is further configured to:

detect that the endpoint system is online;

in response to further detecting that the endpoint system is online, transmit the extracted attributes to other endpoint systems of the plurality of endpoint systems.

15. The system of claim 13, wherein the hardware processor is further configured to:

detect that the endpoint system is online;

in response to detecting that the endpoint system is online, query other endpoint systems of the plurality of endpoint systems for updated attributes;

receive updated attributes for another file; and retrain the machine learning algorithm using the received updated attributes.

16. The system of claim 15, wherein the hardware processor is further configured to:

scan the endpoint system to detect malicious behavior using the retrained machine learning algorithm, wherein the another file is stored on the endpoint system; and determine that the endpoint system exhibits malicious behavior associated with the another file.

17. A non-transitory computer readable medium storing thereon computer executable instructions for optimizing artificial intelligence (A.I)-based malware analysis on offline endpoints in a network, including instructions for:

identifying a file that has not been executed on an endpoint system in a network comprising a plurality of endpoint systems;

determining, from a plurality of classes, a class of the endpoint system;

scanning the endpoint system to detect malicious behavior using a machine learning algorithm;

in response to determining that the endpoint system does not exhibit malicious behavior based on the machine learning algorithm, enabling execution of the file;

subsequent to the execution of the file, rescanning the endpoint system to detect malicious behavior using the machine learning algorithm;

in response to determining that the endpoint system does exhibit malicious behavior subsequent to the execution, extracting attributes of the file; and retraining the machine learning algorithm using the extracted attributes detect malicious behavior associated with the file without having to execute the file;

determining a match value by comparing the class of the endpoint system with classes of other endpoint systems of the plurality of endpoint systems;

determining that the other endpoint systems are of a same class as the endpoint system from the plurality of classes when the match value exceeds a threshold match value; and transmitting the extracted attributes to other endpoint systems of the plurality of endpoint systems in response to determining that the other endpoint systems are of the same class as the endpoint system from the plurality of classes, wherein each other endpoint system is configured to receive and retrain each respective local machine learning algorithm based on the extracted attributes, and wherein the extracted attributes are not transmitted to any endpoint system of the plurality of endpoint systems that is from a different class that does not match the class of the plurality of endpoint system.

* * * * *